Jan. 2, 1945.  K. E. BEMIS  2,366,379

APPORTIONING APPARATUS

Filed Nov. 22, 1943

Inventor
Kenneth E. Bemis
By Philip A. Fridell
Attorney

Patented Jan. 2, 1945

2,366,379

UNITED STATES PATENT OFFICE 2,366,379

APPORTIONING APPARATUS

Kenneth E. Bemis, Oakland, Calif.

Application November 22, 1943, Serial No. 511,377

17 Claims. (Cl. 222—221)

This invention, apportioning apparatus, is an improved apparatus for measuring plastic, powdery, granular, flaky and similar materials, and is particularly designed for measuring specific volumes of ground meats, such as hamburger and sausage, and of soap powders and similar materials. Its particular advantage over conventional types of apportioners exists in its ability to precisely measure and dispense fixed amounts quite irrespective of the consistency of the material within reasonable limits, and to dispense the materials without any tendency of arching such as often occurs with powdery, flaky or granular substances, and without sticking as occurs with plastic materials such as ground meats.

The objects and advantages of the invention are as follows:

First, to provide apportioning apparatus which will accurately apportion and dispense materials irrespective of the nature thereof ranging from plastic to dry and granular to powdery.

Second, to provide apparatus of the type outlined with means for positively advancing the material for apportioning, and prevent arching of the material in the container therefor.

Third, to provide apparatus of the type outlined with means for preventing sticking of plastic materials such as ground meats, in the apportioning device.

Fourth, to provide apparatus as outlined with means for positively ejecting the measured portions.

Fifth, to provide apportioning apparatus which is simple in construction and operation, and economical in both, construction and operation.

Other objects and advantages of the invention will become apparent as the following description is read on the accompanying drawing, in which.

Figure 1:
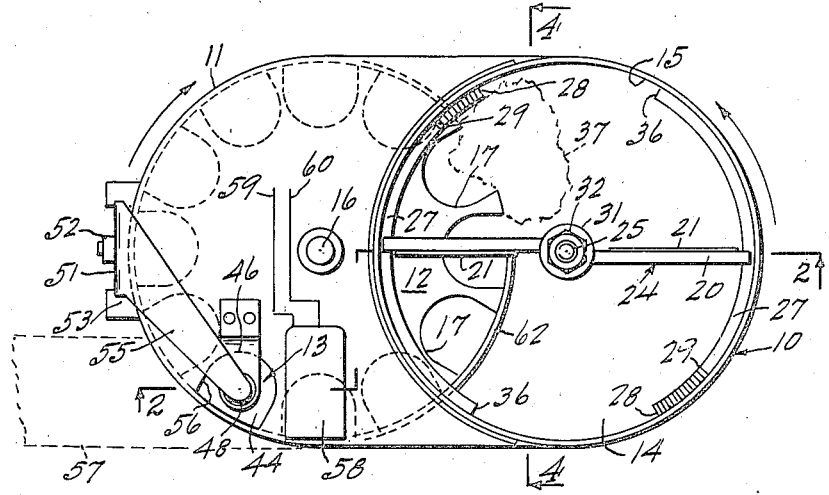
Fig. 1 is a plan view of the invention.

The invention includes a container 10 for the material to be apportioned, and an apportioning disc housing 11, formed as a demountable unit; an apportioning disc 12; an ejector 13; together with agitating, sweeping, heating, and driving means.

The container 10 is preferably cylindrical and has a bottom 14 and side wall 15. The apportioning disc housing 11 opens through the side wall of the container adjacent the bottom as is clearly illustrated in Fig. 2.

Axially mounted in the apportioning disc housing is the apportioning disc 12 which is fixed on the vertical shaft 16 and is provided with equi-angularly spaced peripheral recesses 17 which receive and transfer the material to be apportioned from the container to the ejector in measured amounts. This disc fits closely within the disc housing 11, having a running fit therein, and with a portion of the disc extending into the container as shown, and resting on the bottom thereof.

Axially and removably mounted in the container is the combined agitator and sweep consisting of two cooperative members, one of which forms a backing member for the other. These members each have a hub 18 with a non-circular bore 19 and diametric radial arms 20, the two members being similar except that depending blades 21 are integral with, or attached to the radial arms 20 of the upper member as indicated at 22, preferably on the front face referred to the direction of travel. These two members 23 and 24 are slidable and non-rotatable on the shaft 25 which has the same cross-sectional shape as the bores in the hubs, preferably square.

The shaft 25 is axially and rotatably mounted in the bearing 26 which in integral with or affixed to the bottom of the container.

Fixed to the wall of the container internally are two cams 27 which are mounted in series and oppositely located and which have a riser extending from 28 to 29 and continue therefrom in a plane parallel to the bottom of the container. A spring 30 constantly urges the sweep 24 toward the bottom of the container, and a suitable collar 31 and removable nut 32 secure the spring under tension against the hub of the member 24.

The shaft 25 is uniformly and continuously driven through the medium of the bevel gears 33 and 34 which latter is fixed on the drive shaft 35 which may be driven by any suitable source of power.

Figure 2:
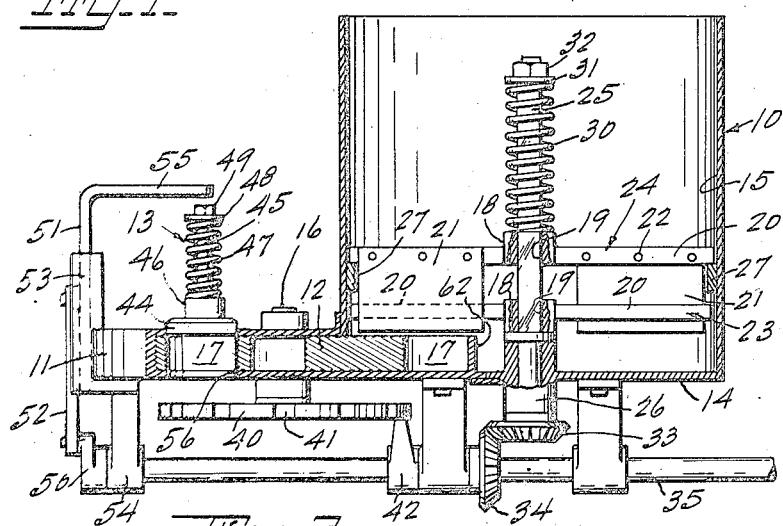
Fig. 2 is a section taken on line 2—2 of Fig. 1 with the drive portions shown in full.
Figure 4:
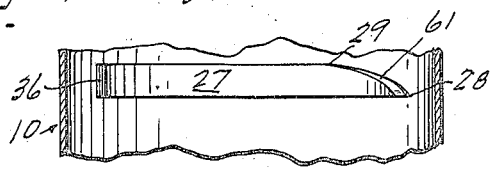
Fig. 4 is a fragmentary view taken on line 4—4 of Fig. 1, showing the sweep-lifting cam on one side of the container.
Figure 3:
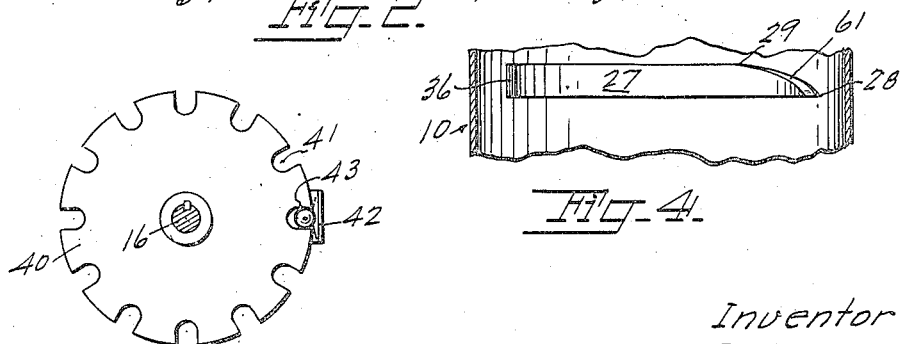
Fig. 3 is a top plan view of the operative connection for the apportioning disc.

As illustrated, the agitator and sweep rotate counterclockwise viewing Fig. 1. The ends of the arms on the upper member 24 ride on top of the cams until they reach the ends 36 of the cams, with the arms on the members 23 backing up the depending blades as shown in Fig. 2, to prevent backward deflection of the blades and consequent cocking of the hub of the member 24 on the shaft 25, which would prevent free sliding movement of the member 24 on the shaft and interfere with the dropping of the blades to the bottom of the container to sweep the material into the recesses in the apportioning disc.

During the period of rotation between the points 29 and 36, the bottoms of the blades 21 just clear the top surface of the apportioning disc. When the member 24 passes the ends 36 of the two cams, the spring 30 urges the member 24 down with the blades just clearing the bottom of the container, the blades sweeping the material 37 into the recesses 17 in the disc during their travel between 36 and 28 of the two cams, and as the arms reach the point 28, the arms rise over the cams to lift the bottoms of the blades to clear the disc. Thus free movement of the member 24 is assured between its elevated and lowered positions, the material is positively swept into the recesses in the disc, agitation is continuous, while sweeping of the material into the recesses is intermittent.

The disc 12 is operated intermittently, the one illustrated being advanced one recess with each revolution of the agitator and sweep, with two sweeps of the blades for each movement of the disc. Obviously, the disc can, if desired, be advanced as many recesses as there are ejectors.

This intermittent movement can be obtained in various ways, such as by a ratchet and pawl, the simplest method being illustrated and consisting of a ratchet disc 40 having radial slots 41 equiangularly spaced and fixed on the shaft 16; and a lever 42 having a ball-end 43 and mounted on the shaft 35 in suitable position so that the ball 43 will cooperate with a slot 41 with each revolution of the shaft 35 and advance the ratchet disc equal to the distance between two slots. Each sweep of the lever 42 advances the apportioning disc an angular distance equal to the angular spacing between the recesses 17.

The ejector consists of a plunger 44 having an upwardly projecting stem 45 which is slidable in the bearing 46 and which plunger is urged to a raised position by the spring 47 which is under tension between the top of the bearing 46 and the washer 48 and nut 49.

One of the simplest methods of operating the ejector is shown, and consists of a crank 50 fixed to the end of the shaft 35 and which operates a slide 51 through a connecting rod 52; the slide being vertically slidable in the bearing 53 which is formed with a depending bearing 54 for the shaft 35. This slide has a horizontally projecting arm 55 which clears the top of the nut 49 or stem 45 when the crank 50 is in its uppermost position, to provide a time-lapse interval for operation of the apportioning disc; depressing the ejector once for each revolution of the shaft 35 to force the material in the registering recess 17 through the passage 56 in the apportioning disc housing. The measured and ejected material may be deposited on a suitable conveyor 57, or disposed of in any other suitable manner.

A heater 58 is mounted on the apportioning disc housing to heat the surfaces to soften or melt any fats in ground meats which might be inclined to stick or create undue friction, thus converting a potential sticky substance into a lubricant. This heater is indicated as an electric heating unit with suitable terminals 59 and 60 for connection to a suitable source of current.

The operation of the invention is as follows:
The ground meat or other material to be apportioned is placed in the container 10 and the drive shaft 35 is driven by some suitable source of power such as a motor (not shown), at a speed around 60 R. P. M., the speed of operation or permissible speed obviously being dependent upon the nature of the product and the relative size of the apparatus.

The shaft 35, through gears 33 and 34, drives the shaft 25, and coincidently the members 23 and 24, continuously in one direction as indicated by the arrow. The member 23 operates in one plane, while the member 24 raises and lowers twice in each revolution. As these members rotate, the ends of the arms on the member 24 ride on top of the cams 27 with the blades 21 just clearing the top surface of the apportioning disc until the ends 36 of the respective cams are reached, passing which the arms become free and the member 24 drops and is urged to drop by the spring 30, with the blades 21 justs clearing the bottom of the container and sweeping the material into the recesses 17, and just previous to reaching the periphery of the disc, the arms are again engaged by the cams and climb up the incline 61 to again clear the top surface of the disc. The arms on the member 23 back up the blades 21 to prevent backward deflection and consequent cocking of the hub of the member 24 on the shaft 25 so that the vertical sliding movements of the member 24 will be free and positive. A peripheral strip 62 forms a guard and retainer for the periphery of the follow portion of the disc, in which the tendency of the members 21 would be to drag the material out of the recesses.

When the members 23 and 24 reach the top of the incline 61, the ball on the lever 42 engages in one of the slots 41 on the ratchet disc and moves the ratchet disc and the apportioning disc the angular distance between two recesses 17 or slots 41; the recess remaining in its instant position while the sweep operates twice to force the material into the recess.

This movement of the disc simultaneously brings one of the filled recesses into registry with the passage 56 through the apportioning disc housing, and as the discs reach their terminus of movement, the arm 55 through the crank 50 and connecting rod 52 depresses the plunger 44, ejecting the material in the recess, then returns to release the plunger which is raised by the spring 47 to clear the disc for the next operation.

This apparatus is particularly suited for use in connection with the Patty making machine as claimed in Patent Number 2,299,314, issued October 20, 1942.

I claim:

1. Apportioning apparatus, in combination, a container for material to be apportioned; an apportioning disc having peripheral apportioning recesses with a minor portion of the disc extending into said container and having an axial mounting parallel to and externally of said container, and a housing for the remainder of the disc and extending outwardly from the lower end of said container; sweeping means for sweeping the material into said recesses and for cutting off the material in the recesses to the level of the top of the disc; ejector means registrable with said recesses in sequence and in registry with a passage formed through said housing externally of said container; and driving means for driving said sweeping means continuously and operating said apportioning disc and said ejector means intermittently and in sequence.

2. Apportioning apparatus, in combination, a container for material to be apportioned; an apportioning disc having peripheral apportioning recesses with a portion of the disc extending into said container, and a housing for the remainder of the disc; sweeping means for sweeping the material into said recesses; ejector means registrable with said recesses in sequence and in registry with a passage formed through said housing externally of said container; driving means for driving said sweeping means continuously and operating said apportioning disc and said ejector means intermittently and in sequence; said sweeping means comprising; an axial shaft in said container; a pair of cams in series and mounted on opposite sides internally of said container and with the ends spaced; a member slidable and non-rotatable on said shaft and having arms extending in opposition to ride on said cams to raise said sweeping means to clear the intruding portion of said disc, and a spring under tension on said shaft urging said sweeping means to the bottom of the container in the intervening space between the ends of the cams.

3. A structure as defined in claim 1; driving means including a drive shaft; said ejector comprising; a plunger registrable with the respective recesses in sequence and having a stem; a bearing for said stem; a spring normally urging said plunger to a raised position; a crank on said drive shaft and an arm having an operative connection to said crank for depressing and releasing said ejector through cooperation with said stem.

4. Apportioning apparatus comprising; a container having a vertical axis; a disc mounted on an axis parallel to that of the container and externally thereof and having equi-angularly spaced passages formed therethrough and extending out through the periphery of the disc, and means for rotatably advancing said disc in steps; sweeping means and driving means therefor for filling said recesses with material to be apportioned and for scraping the material to the level of the top face of said disc; and means for ejecting the material from said recesses and located externally of said container.

5. Apportioning apparatus comprising; a container having a vertical axis; a disc mounted on a vertical axis externally of said container and having equi-angularly spaced passages formed therethrough and opening through the periphery of said disc, and a housing for said disc and having a passage therethrough registrable with said passages in sequence, and means for rotatably advancing said disc an angular distance equal to the spacing of said passages; sweeping means and driving means therefor for filling said recesses with material to be apportioned and for scraping the material level with the top face of the disc.

6. A structure as defined in claim 5; said driving means including a shaft; ejector means in registry with said passage through said housing for ejecting the apportioned material from said recesses in sequence, a crank on said shaft and an operative connection between said crank and said ejector means and including a slide member having an arm cooperative with said ejector means only during a portion of each revolution of said shaft.

7. Apportioning apparatus comprising; an apportioning disc having equi-angularly spaced peripheral recesses formed therethrough and opening through the periphery of the disc; a container for material to be apportioned and including a minor portion of said disc; a housing having its axis parallel to the axis of, and externally of said container and including a peripheral wall for the remainder of said disc externally of said container, and a top wall therefor, and a bottom wall for said housing and said container, and a passage formed through said top and bottom walls and registrable with said recesses in sequence for discharge of apportioned material from said recesses; means for step driving said disc, said disc having an axial mounting coincident with the axis of said housing; sweeping means and driving means therefor in said container for urging the material into said recesses and for scraping the material level with the top face of said disc.

8. Apportioning apparatus comprising; an apportioning disc having equi-angularly spaced peripheral recesses formed therethrough and opening through the periphery of the disc; a container for material to be apportioned and including a minor portion of said disc; a housing having its axis parallel to the axis of, and externally of said container and including a peripheral wall for the remainder of said disc externally of said container, and a top wall therefor, and a bottom wall for said housing and said container, and a passage formed through said top and bottom walls and registrable with said recesses in sequence for discharge of apportioned material from said recesses; means for step driving said disc, said disc having an axial mounting coincident with the axis of said housing; ejector means in registry with said passage, and actuating means including said crank, a slide member operated by said crank and cooperating with said ejector means only during a portion of each cycle for ejecting apportioned material from said recesses.

9. Apportioning apparatus comprising; an apportioning disc having equi-angularly spaced peripheral recesses formed therethrough and opening through the periphery of the disc; a container for material to be apportioned and including a minor portion of said disc; a housing having its axis parallel to the axis of, and externally of said container and including a peripheral wall for the remainder of said disc externally of said container. and a top wall therefor, and a bottom wall for said housing and said container, and a passage formed through said top and bottom walls and registrable with said recesses in sequence for discharge of apportioned material from said recesses; means for step driving said disc, said disc having an axial mounting coincident with the axis of said housing; sweeping means in said container for urging material into said recesses and for scraping the material to the level of the top of the disc; ejector means in registry with said passage; and driving means for driving said sweeping means continuously and, said disc, and said ejector means in sequence.

10. Apportioning apparatus, in combination, a container for material to be apportioned; an apportioning disc having peripheral apportioning recesses with a portion of the disc extending into said container, and a housing for the remainder of the disc; sweeping means for sweeping the material into said recesses; ejector means registrable with said recesses in sequence and in registry with a passage formed through said housing externally of said container; driving means for driving said sweeping means continuously and operating said apportioning disc and said ejector means intermittently and in sequence; said sweeping means comprising; an axial shaft in said container and having a bearing at its lower end and securing means at its upper end; upper and lower members having each a hub slidable and non-rotatable on said shaft and having each two radial arms in diametric relation, depending blades on the arms of said upper member backed up by the arms of said lower member; two cams in series and oppositely located and mounted on the inner walls of said container with the terminal ends spaced; a spring surrounding said shaft and under tension between said securing means and said upper member; the ends of said arms on said upper member riding on said cams to clear the inwardly projecting portion of said apportioning disc, said spring depressing said upper member with the blades substantially in contact with the bottom of said container during the travel of said arms of the upper member through the intervening space between the terminal ends of said cams.

11. A structure as defined in claim 1; said ejector comprising; a plunger in registry with said passage in said apportioning disc housing and having a vertical stem, a bearing for said stem and coincidently functioning as a stop for said plunger; holding means at the top of said stem, and a spring under tension between said holding means and said bearing; said step driving means including a shaft and a crank on said shaft; a slide member having an operative connection with said crank, and an arm for cooperation with said stem during one portion of a cycle of said crank for depressing said stem to eject the apportioned material, and release the stem during the other portion of the cycle said spring raising said ejector as released to clear said disc.

12. Apportioning apparatus comprising; a container having a bottom and a circumferential side wall; an axial shaft having a bearing at the bottom; an upper member and a lower member each having a hub and opposed arms and slidable and non-rotatable on said shaft; tensioning means at the upper end of said shaft and a spring under tension between said tensioning means and said upper member; depending blades mounted on the arms of said upper member and backed by the arms of said lower member to prevent cocking of the member on said shaft; two cams in series and oppositely located and mounted on the wall of said container with the terminal ends of the cams spaced apart; the arms of said upper member cooperating with said cams throughout their extent and being free to drop and be depressed by said spring throughout the intervening space between the ends of said cams, with said blades just clearing the bottom of said container; an apportioning disc having a portion thereof extending into said container and having equiangularly spaced peripheral recesses; a housing for said disc and having a passage formed therethrough externally of said container and with which said recesses are registrable; ejector means in registry with said passage; and driving means for driving said axial shaft continuously, and said disc and said ejector means intermittently and in sequence.

13. Apportioning apparatus comprising; a container; an apportioning disc having its axis parallel to the axis of and externally of said container with a portion of the disc extending into the container and having equi-angularly spaced peripheral recesses; urging means for urging material to be apportioned into said recesses and for scraping excess material from the top of said disc; ejector means externally of said container for ejecting the material from said recesses; and driving means for continuously driving said urging means and step driving said apportioning disc and said ejector in sequence.

14. A structure as defined in claim 13; a housing for the remainder of said apportioning disc exteriorly of said container and including a bottom common with said container, and a passage formed through said housing exteriorly of said container for registry with the respective recesses, for discharge of apportioned material from said recesses.

15. A structure as defined in claim 13; a housing for the remainder of said apportioning disc and including a bottom common with said container, and a passage formed through said housing exteriorly of said container for registry with the respective recesses for discharge of apportioned material; said urging means comprising an axial shaft in said container and sweep mechanism mounted on said shaft and operating adjacent the bottom of said container during a portion of each revolution of the shaft to urge the material into said recesses and including cam means in said container for raising said sweep mechanism to clear the portion of said disc extending into said container and sweep excess material from the top face of said disc during the remainder of each revolution.

16. A structure as defined in claim 13; a housing for the remainder of said disc and including a bottom common with said container, and a passage formed through said housing exteriorly of said container; said ejector means being mounted on said housing in registry with said passage and including a plunger and a bearing therefor; said driving means including a drive shaft; a crank on said drive shaft; a slide mounted on said housing and operatively connected to said crank and having an arm for cooperation with said plunger during only a portion of each cycle of said crank to provide a delay for said plunger during movement of said disc.

17. Apportioning apparatus comprising; an apportioning disc and a container with the apportioning disc projecting partly into the container and having its axis externally thereof, and a housing for the remainder of said disc exterior of said container, and equiangularly spaced peripheral recesses formed through said disc and extending through the periphery and registrable with an ejector passage formed through said housing; urging means for urging material in said container into said recesses and scraping material level with the top of said disc, and ejector means in registry with and operable through said passage; and driving means for driving said urging means continuously and said apportioning disc and said ejector means for operation in sequence.

KENNETH E. BEMIS.